(12) United States Patent
Barboi et al.

(10) Patent No.: US 7,840,535 B2
(45) Date of Patent: Nov. 23, 2010

(54) REPLICATED DATA VALIDATION

(75) Inventors: Dima Barboi, Rehovoth (IL); Leonid Shtilman, Somerville, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1192 days.

(21) Appl. No.: 10/981,837

(22) Filed: Nov. 5, 2004

(65) Prior Publication Data

US 2006/0101097 A1 May 11, 2006

(51) Int. Cl.
*G06F 7/00* (2006.01)
*G06F 17/00* (2006.01)

(52) U.S. Cl. .................. 707/634; 707/690

(58) Field of Classification Search ............ 714/7; 707/10, 610–639, 674–686, 690, 999.202–999.204
See application file for complete search history.

(56) References Cited

U.S. PATENT DOCUMENTS

| 5,615,364 | A | | 3/1997 | Marks | 707/202 |
| 5,974,563 | A | | 10/1999 | Beeler, Jr. | 714/5 |
| 6,092,066 | A | * | 7/2000 | Ofek | 707/10 |
| 6,711,572 | B2 | | 3/2004 | Zakharov et al. | 707/10 |
| 6,959,369 | B1 | | 10/2005 | Ashton et al. | 711/162 |
| 7,055,059 | B2 | * | 5/2006 | Yanai et al. | 714/7 |
| 7,139,782 | B2 | * | 11/2006 | Osaki | 707/204 |
| 7,152,183 | B2 | * | 12/2006 | Fujibayashi | 714/6 |
| 2002/0178360 | A1 | * | 11/2002 | Wenocur et al. | 713/170 |
| 2004/0083245 | A1 | | 4/2004 | Beeler, Jr. | 707/204 |

OTHER PUBLICATIONS

Oracle® Database Advanced Replication Management APR Reference, 10g Release 1, Dec. 2003 Oracle®.*
"Management of Replicated Volume Location Data in the Ficus Replicated File System," T.W. Page, Jrl and J.S. Heidemann and G.J. Popek and W. Mak and D. Rothmeier. In *Proceedings of the Summer USENIX Conference*, pp. 17-29, Jun. 1991.
"Replication in Ficus Distributed Systems," G.J. Popek and R.G. Guy and T.W. Page, Jr. and J.S. Heidemann. In *Proceedings of the Workshop on Management of Replicated Data*, pp. 20-25, Nov. 1990.
"Implementation of the Ficus Replicated File System," R.G. Guy and J.S. Heidemann and W. Mak and T. J. Page, Jr. and G.J. Popek and D. Rothmeier. In *Proceedings of the Summer USENIX Conference*, Anaheim, CA, pp. 63-71, Jun. 1990.
"Ivey: a study on replicating data for performance improvement," S. Lo. *Hewlett-Packard Laboraties Concurent Computing Department*, pp. 1-39, Dec. 1990.
"A Comparison of Two Approaches to Built Reliable Distributed File Servers," A. Bhide and E.N. Elnozahy and S. Morgan and A. Siegel. In *Proceedings of the 11th International Conference on Distributed Computing Systems*, pp. 616-623, May 1991.

(Continued)

*Primary Examiner*—Shew-Fen Lin
*Assistant Examiner*—Hosain Alam
(74) *Attorney, Agent, or Firm*—Pillsbury Winthrop Shaw Pittman LLP

(57) ABSTRACT

An approach to validating replicated data allows use of a validation procedure that may modify the data replica. The approach features suspension of updating of the data replica for data replication and enabling restoration of the data replica to a state prior to any modification of the data as a result of the validation procedure. After validation, the data replica is restored before resuming updating for data replication.

14 Claims, 2 Drawing Sheets

OTHER PUBLICATIONS

"A Highly Available Network File Server," A.K. Bhide and E.N. Elnozahy and S.P. Morgan. In *Proceedings of the USENIX Winter Conference 1991*, pp. 199-205, Jan. 1991.

"Implicit Replication in a Network File Server," A.K. Bhide and E.N. Elnozahy and S.P. Morgan In *Proceedings of the Workshop on Management of Replicated Date*, Nov. 1990.

\* cited by examiner

REPLICATED DATA VALIDATION

BACKGROUND

This invention relates to validation of replicated data.

Data replication systems can provide highly-reliable data backup by continuously monitoring changes made to application data at one computer and applying those changes to a copy of the application data, which can be referred to as a "replica" of the application data. Typically, the copy of the application data is physically remote from the primary copy of the data, and is hosted on a separate computer system. In some approaches, replicas of entire file systems are maintained, while in other approaches only particular application-specific files are replicated.

In order to ensure that the replicated data would be suitable as a backup copy should the primary data be corrupted or otherwise become unavailable, data validation procedures can be performed on the data replica. One way to do this is to suspend the replication procedure while such validation is performed. For example, in the case of a database application, replication of the tables can be suspended and the validity of data tables in the application data can be verified. In some situations, such validation is mandated to be performed on a regular schedule, such as once a day. Performing certain types of validation procedures may result in modification of the data. Therefore, after the validation procedure is completed, the data replica is fully re-synchronized with the primary data, which in general will have changed while the validation procedure was performed, before continuous replication is restarted.

SUMMARY

In one aspect, in general, the invention features a method and an associated system and software for validating replicated data. The approach allows validation of a data replica where the validation may modify the data replica. The approach features suspension of updating of the data replica for data replication and enabling restoration of the data replica to a state prior to any modification of the data as a result of the validation. After validation, the data replica is restored before resuming updating for data replication.

In another aspect, in general, the invention features a method and an associated system and software for validating replicated data. A data replica is continuously updated based on updates of application data. This updating of the data replica is suspended. The approach enables restoration of the data replica to a state after suspension of the updating. Validation of the data replica is enabled such that the validation allows modification of the data replica. The data replica is restored to the state after suspension of the updating, and the updating of the data replica based on updates of the application data is resumed.

Aspects of the invention can include one or more of the following features.

The data replica is validated in such a way that the data replica is modified.

Validating the data replica includes executing an instance of a same software application as caused the updates of the application data. As examples, the software application can include a database application, a mail server, or a file server.

Enabling restoration of the data replica includes recording information sufficient to restore the data replica to the state after suspension. Restoring the data replica includes using the recorded information.

Recording the information to restore the data replica includes monitoring update requests for the data replica made by an application performing the validation.

Suspending updating of the data replica include storing update requests to the application data made while the updating is suspended. The update requests can be stored at a replication client and/or at a replication server. Resuming updating of the data replica can then include applying the stored update requests to the data replica.

Suspending updating of the data replica includes selecting the updates to apply prior validating the data replica. Selecting the updates can include applying application-specific rules to select the updates. As examples, the update requests can be selected according to content of the update requests and/or a temporal pattern of the update requests.

In another aspect, in general, the invention features a data replication system. The system has a storage for a data replica. The system also has a first module coupled to the storage and configured to receive updates to application data and apply the updates to the data replica, and to selectively suspend applying of the updates. The system also has a second module coupled to the storage and configured to enable restoration of the data replica to a state after suspending of applying of the updates by the first module. The first module is further configured to apply updates made to the application data during the suspension of the application of the updates and to resume applying received updates to the application data. The system can further have a storage coupled to the second module for information sufficient to enable restoration of the data replica. The second module can be further configured to monitor update requests to the data replica, and record information sufficient to enable restoration of the data replica to a state prior to application of the monitored update requests to the data replica.

Advantages of aspects of the invention can include one or more of the following.

Validation of the replicated data can be performed using applications that modify the data without having to interrupt the replication process and without having to perform a full synchronization of the replicated data. For example, a second instance of the primary application can be used to validate the replicated data.

Validation can be performed on a relatively frequent schedule with less disruption of operation of the replication system than using previous approaches.

Validation can be initiated and performed in an automated fashion with notifications sent of final validation results, for example, by electronic mail or through a system log, decreasing the need to involve human personnel.

Validation can have insubstantial negative impact on operation the production system. For example, the replication process does not have to be interrupted in that updates to the application data are recorded but not applied to the data replica while the validation is performed.

Other features and advantages of the invention are apparent from the following description, and from the claims.

DESCRIPTION

1 System Overview

Figure 1:
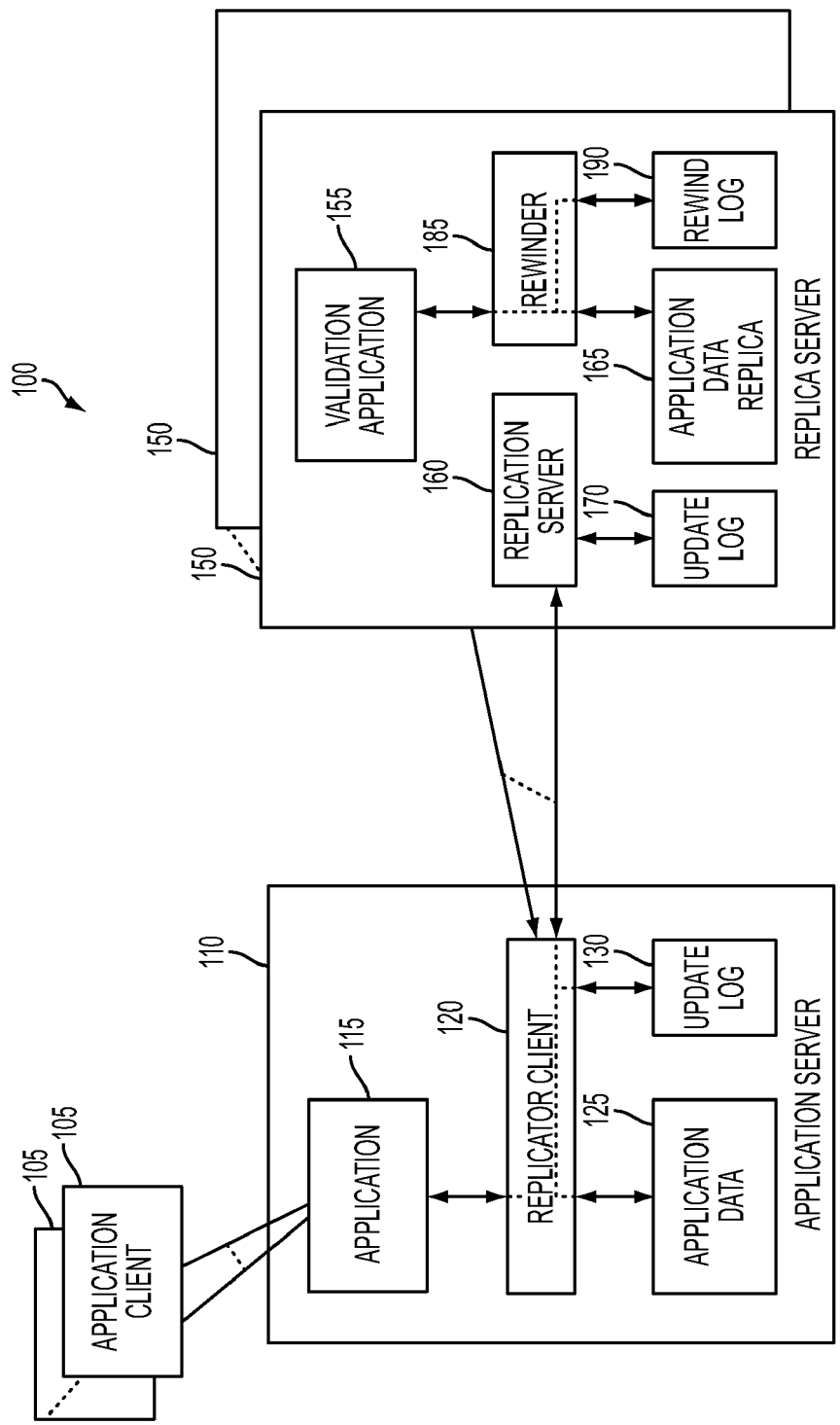
FIG. 1 is a block diagram of a replicated system.

Referring to FIG. 1, a replicated system 100 includes an application server 110 and one or more replica servers 150. An application 115 executes on the application server 110 and manipulates application data 125 that is stored at the application server. For example, application 115 is a database application and the application data includes the database tables manipulated by the database application. As another example, application 115 is a mail server application, and the application data 125 includes the mail message stores used by the mail server application. As a further example, application 115 is a file system, which is a component of or layered on an operating system, and the application data 125 are the files that are accessible through that file system. Optionally, the application 115 is a server application that provides services to application clients 105, which typically execute remotely to the application server. The application server 110 and replica servers 150 may be hosted on physically separate computers, or may share one or more computers, for example, corresponding to separate software components executing on a single computer.

A replication client 120 on the application server 110 monitors data access requests passing from the application 115 that modify the application data 125. The replication client 120 passes copies of these requests to a replication server 160 at each of one or more replica servers. Each replication server maintains an application data replica 165, which tracks the application data 125 at the application server 110. The replication server modifies application data replica 165 based on the received copies of the data modification requests to track the application data 125. In general, there may be some lag between the application data 125 being updated and the corresponding updating of the application data replica 165.

In general, in applying the sequence of updates to the application data replica, there may be times at which the replica data is a valid (or desirable) starting point for restoring the application data should there be a failure while at other times the data may be in an invalid or less desirable state. For example, in the case of a database application, the tables may not be in a consistent state at all times. The combination of the replication client 120 and the replication server 160 analyze the access requests to the application data 125 that are sent by the application 115 and determine at which points the application data should be valid. For example, the point after a database application performs a checkpoint of the data tables is used as an indicator that the tables are in a valid state.

Figure 2:
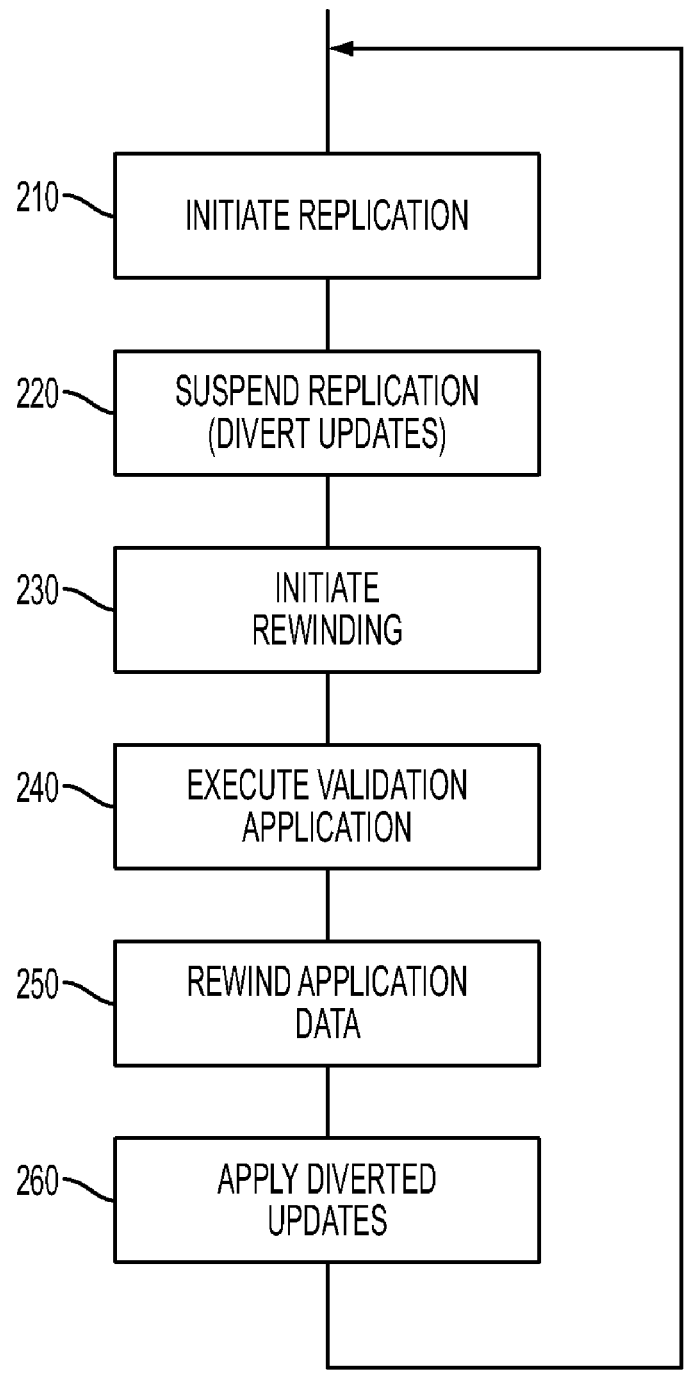
FIG. 2 is a flowchart of a validation procedure.

At the replication server 160, it is desirable to be able to expressly validate the data replica rather than solely relying on the integrity of the replication process. For example, an error may have been introduced during the storage of the data or a human operator error may have introduced an error. An overall process for such express validation in an operational context is illustrated in the flowchart of FIG. 2.

Replication of the application data 125 is initiated (step 210), for example, by an operator or by an automated process (e.g., on a schedule or triggered by a predetermined condition). The data replica 165 is maintained as a copy of the application data 125, with some possible lag in application of updates to the application data. That is, the data replica may be somewhat out of date. During the continuous replication, update requests may be stored in an update log 130 at the application server 110 prior to their being sent to the replica server 150. For example, the update log 130 may be stored in a non-volatile disk storage on the server.

As a first step to validation, the continuous replication of the application data is suspended (step 220). Updates to the data replica are applied to a point that the data is expected to be valid, for example, based on the replication client and server detecting update activity corresponding to a valid state of the data. While replication is suspended, the application 115 at the application server continues to operate. Part of the replication process continues such that updates to the application data 125 are logged either in the update log 130 at the application server or alternatively at an application log 170 at the replica server 150. If the application server 110 and replica server 150 are listed on a common computer, the update logs 130 and 170 may correspond to a common log.

At this point, the application data replica 165 is not changed based on activity at the application server, although the application data 125 is changing with updates being logged. Prior to invoking the validation application 155, a rewinder 185 is initiated (step 230). The rewinder 185 is a module that maintains a rewind log 190 of all updates to the application data replica 165 that are made by the validation application 155. The rewinder 185 monitors access requests to the application data replica 165 in much the same manner as the replication client 120 monitors access requests by the application 115. The rewinder stores a copy of all update requests or equivalent information needed to undo the effect of the update requests, in the rewind log 190.

In alternative embodiments, the function of the rewinder 185 is served by a component that has a capability to restore the data to its state at a specific previous time. This capability may be a built-in capability of the storage system on the replica server 150. For example, the storage system may have a snapshot capability, a special-purpose file system that allows rewinding. One alternative to the use of the rewinder 185 is to make use of a traditional backup and restore approach in which the replicated data is backed up to a medium, such as magnetic tape, prior to performing the validation procedure and restored from the medium after the procedure is completed.

Having initiated the rewinder, the validation of the application data replica 165 can proceed, with the validation potentially making changes to the data that are captured by the rewinder in the rewind log. The validation application 155 is executed, for example, under an operator's control or based on an automated script (step 240). The validation application either determines automatically whether the data replica 165 is valid, or produces output based on the data replica that is then used to determine the validity of the data replica.

The validation application 155 can be another instance of application 115. In such a case, the validation essentially determines whether, if the data replica were used to restore the primary application data 125, the application 115 would be able to properly access and use the data. In addition to determining whether the application data replica can be opened, the various test or regression scripts can be performed to further validate the data. For example, if the application 115 is a mail server application, then validation application 155 can be another instance of the same mail server application, which determines the validity of the replicated mail store in data replica 165.

The validation application 155 can alternatively be a special-purpose application that is designed to specifically check the validity of the data replica. For example, rather than providing the full functionality of the application 115, such a special-purpose application may solely open and check internal consistency of the data replica. Multiple different validation applications 155 can also be used, each checking different aspects of the data replica.

Once the execution of the validation application 155 is completed, the rewinder 185 reverses the application of the updates in the rewind log 190 in order to restore the data replica to the state when the replication was suspended (step 250), In alternative embodiments some other approach restores the data replica to the state when the replication was suspended. In general, the validation applications perform relatively little modification of the data replica, and therefore this rewinding step is not computationally burdensome.

Finally, before reinitiating the normal continuous replication, the diverted updates that were stored in the update log 130 and/or the update log 170 are applied to the application data replica (step 260). Continuous replication is then again initiated (step 210). Alternatively, if the continuous replication system is normally able to divert updates (for example, in the event of a lost connection between the application server 110 and the replication server 150), continuous replication may be initiated and the diverted updates applied as a normal part of continuous replication.

2 Replication Client and Server

In the replication system 100, the replication client 120 captures changes to the application data 125 for transfer to the replication server 160. Before continuous replication begins, or any time the two datasets (application data 125 and data replica 165) differ by more than the set of recorded, but still-unapplied, modifications, the data replica 165 is synchronized with the application data 125. There are a variety of methods suitable for doing such synchronization. One example is a simple copy of the data from the application server 110 to the replica server 150. Another example is a process that compares the two datasets and sends only the differences.

The replication client 120 on the application server 110 monitors data modification requests passing from the application 115 to the application data 125. The replication client may be, for example, a filter in the file system or storage system drivers of the application server 110. Alternatively, it may be a module invoked by any stage of the interaction between the application and the application data.

The replication client 120 sends application data modification requests to one or more replication servers 160. It may do this synchronously or asynchronously and it may employ an update log in volatile or non-volatile storage on the replication client and/or server analogous to the update logs 130 and 170 used to divert updates during suspension. The transfer of the modification requests may use any of a variety of communication methods, including, for example, network protocols like TCP/IP, shared network storage, or file protocols like CIFS or NFS. If the replication server is located on the same computer as the replication client, transfer of the data modification requests may also be performed through a simple notification system consisting, for example, of signals or function invocations.

The replication system 100 transfers not only the application data, but also attributes (metadata) of the files containing the data. This may be done explicitly at the file level or by block-level replication of all data on the storage.

Optionally, encryption and compression may be used during transfer of modification requests in order to ensure the privacy of the information or to reduce the bandwidth required to support the replication.

The replication server 160 which receives the data modification requests from the replication client 120 may store them or leave them in journals for a period of time, or may apply them immediately as they are received. It may even apply them synchronously, in which case the replication client 120 may block further update to application data 125 until notification by the replication server 160 that the modification has been applied to the application data replica 165.

When ready, the replication server applies the data modification requests received from the replication client in the order they were received, causing the replica data 165 to go through a series of states that parallel the states of the application data 125, possibly with a time lag.

Either the replication client 120 or the replication server 160 may use the content of data modifications or temporal or spatial patterns of sequences of one or more data modifications to recognize particular events related to the application. For example, a particular sequence of updates to a database may be recognized as that database application's checkpoint. Such events may be indicative of the particular state of the application data, for example, that the data is known to be in a valid or desirable state.

3 Rewinder

The rewinder 185 allows a data set such as the application data replica 165 to be restored to a specific previous state after it has undergone. The rewinder may be of two different types: continuous or discrete.

With a continuous rewinder, the rewinder has the ability to restore the data to arbitrary points of time in the past. It may operate at the level of either files or raw data blocks on a device. It may operate by recording a log of modifications required to "undo" the modifications performed on the data. Alternatively, it may record modifications in such a way that all previous times are available without the need to actually undo modifications. The continuous rewinder may operate as a file system filter driver, as a special file system, or may operate directly on temporary logs maintained by the replication system.

With a discrete rewinder, the rewinder has the ability to restore one or more discrete points in the past. A snapshot or backup capability is an example of a discrete rewinder.

The rewinder may be able to operate only on a full volume, but may also be capable of operating only on a specified subset of the data. For example, the rewinder may be initiated only on a single information store within a mail database.

4 Use Scenario

An example of the use of the method is a Microsoft SQL 2000 server (the application 115) supporting, for example, an inventory system. The database files used by SQL 2000 are the application data 125. The application clients 105 may be point-of-sale (POS) or order system applications. Whenever an order is made or a shipment is received, the application data 125 is updated and the replication client 120 replicates the modification to the data 125 to the replication server 160, where the modification is applied to the application data replica 165.

In order to validate the application data replica 165, the described method may be started by suspending replication (step 220) from the application server and initiating rewinding (step 230).

A possible validation application (step 240) in this case would be to start SQL 2000 on the replica server, compute inventory totals to compare against totals maintained within the database, and to perform several updates to the data that emulate normal operation of the system.

Once the validation checks have been performed, the replica data is rewound (250) to the state that existed at the point replication was suspended. Accumulated updates to the application data are then applied (step 260) and normal replication is reinitiated (step 210).

5 Implementation

In one implementation, the replication client 120 is a file system filter driver installed on the application server 110. As file system operations pass through the filter, those operations that modify data or metadata of the file system are captured and recorded to a journal on non-volatile storage on the application server. Periodically, the journal of modifications is closed, and a new journal is started. Journal entries and individual journals are time stamped to ensure that they may be applied in precisely the same order on the replica server. Periodically, accumulated modifications in one or more such journals are transferred via a TCP/IP connection to the replica server 150 using a protocol that ensures that journals are successfully delivered.

The replication server 160 is a non-kernel-level application that processes journals transferred from the replica client with a certain delay after they arrive. For example, the replication server may consistently leave a certain number of journal files unprocessed at any given point in time. Once a journal is to be processed, the file-level operations recorded in the journals are carried out in precisely the order they were performed on the application server.

At the point when validation is to be performed, the replication client on the application server suspends sending journals as they are generated until replication is resumed.

The replication server plays operations in the remaining journals up to a point that it recognizes as a desirable state of the application, for example, the previously identified specific pattern of writes determined to correspond to a checkpoint of the database. At that point, the replication server ceases performing the replicated updates.

The replication server invokes a rewinder that, like the replication client, acts as a file system filter driver on the replica. As file system operations pass through the filter, those operations that modify data or metadata of the file system are captured and the inverse operations are recorded to a journal on non-volatile storage on the replica server. For example, if data is appended to a file, a corresponding truncate command is recorded to the rewind journal that will undo the data-append operation. Rewinding is performed by replaying the recorded inverse operations in reverse order to the desired point in time.

The verification application is not necessarily dependent on other aspects of the implementation, since it is to be determined by the user of the method; however, an example is to start the application on the replica server and to perform a variety of updates to the data to ensure the database is in a valid, working state.

The appropriate sequencing of these operations to implement the method described may be encoded in a stand-alone application that communicates with the replication system through a pre-specified API to suspend and resume replication. Alternatively, the same functionality may be implemented as a module within the replication system itself.

A version of the system described above is implemented in software for execution on a general-purpose processor. The software implementing the approaches and specific algorithms described above are stored in the system, for example, in a non-volatile solid-state memory (e.g., magnetic disk or flash memory). The software may form modules that are application level programs, dynamic libraries for application programs, or operating system components (i.e., statically included or dynamically loaded components). For example, the replication client can be implemented in a software module that is executed in an operating system environment on the application server and replication server can be implemented in a software module that is executed in an operating system environment on the replica server. The software may be provided on a medium, such as solid state memory or media, or magnetic or optical media, or downloaded over a wired or wireless communication network (i.e., with the instructions carried on signal propagating over a communication medium). Versions of the system may be implemented in hardware or software, or a combination of both (e.g., programmable logic arrays, special purpose processors/controllers, etc.). Unless otherwise specified, the algorithms are not inherently related to any particular computer or other apparatus. Each such program may be implemented in any desired computer language to communicate with a computer system. The computer language may be a machine, assembly, scripting (e.g., shell script), high level procedural, logical, or object oriented programming languages, and may be interpreted, compiled, or partially compiled (such as byte coded).

6 Alternatives

In one alternative approach, rather than using the rewinder 185 to enable restoring of the state of the application data replica 165 to that just prior to execution of the validation application 155, a backup component is used to make a backup of the data replica, for example, to another file system or to a backup medium. After execution of the validation application, the backup of the data replica is restored, and continuous replication is restarted after applying the updates that were diverted to the update logs during the validation procedure.

The replication server 160 and the rewinder can be implemented as independent software modules, for example, being provided by different software vendors. That is, little if any coordination between these modules is required. Alternatively, the functionality of the replication server and the rewinder can be combined.

The various software modules described above can be hosted in different ways on one or more computers. At one extreme, all the modules may be hosted on a single computer, for example, with the data replica and the primary application data being stored on different disks on the same computer. Alternatively, the application 115 and the validation application 155 can be hosted on yet other computers than the application server and the replica server.

In another alternative, the replica database may be restored to a state equivalent to the state of the application data by performing a full synchronization of the data just as in an initial synchronization before replication It is to be understood that the foregoing description is intended to illustrate and not to limit the scope of the invention, which is defined by the scope of the appended claims. Other embodiments are within the scope of the following claims.

What is claimed is:

1. A method for validating replicated data, the method comprising:

tracking modifications to an application data replica, the tracked modifications enabling the application data replica to be restored to one or more prior states;

receiving one or more requests to update the application data replica;

validating the application data replica, wherein the tracked modifications include at least one modification to the application data replica caused by the validating;

reversing the at least one modification to the application data replica, wherein the reversing causes the application data replica to be restored to a state prior to the validating; and applying the received update requests to the restored application data replica, wherein the tracked modifications include at least one modification to the application data replica caused by the applying.

2. The method of claim 1, wherein validating the application data replica includes executing an instance of a software application that updates a data source associated with the application data replica.

3. The method of claim 2, wherein the software application includes a database application.

4. The method of claim 2, wherein the software application includes a mail server.

5. The method of claim 2, wherein the software application includes a file server.

6. The method of claim 1, further comprising pending the applying of the received update requests until completion of the validating and the reversing.

7. The method of claim 6, wherein pending the received update requests includes storing the received update requests at a client.

8. The method of claim 6, wherein pending the received update requests includes storing the received update requests at a server.

9. The method of claim 1, further comprising selecting one or more of the received update requests to be applied prior to the validating of the application data replica.

10. The method of claim 9, wherein selecting the one or more of the received update requests includes applying application-specific rules to the received requests to select the one or more of the received update requests.

11. The method of claim 10, wherein applying the application-specific rules includes selecting the one or more of the received update requests according to at least one of content of the received update requests or a temporal pattern of the received update requests.

12. A non-transitory computer-readable media storing computer-executable instructions for validating replicated data, the instructions causing a computer system to:
track modifications to an application data replica, the tracked modifications enabling the application data replica to be restored to one or more prior states;
receive one or more requests to update the application data replica;
validate the application data replica, wherein the tracked modifications include at least one modification to the application data replica caused by the validating;
reverse the at least one modification to the application data replica, wherein the reversing causes the application data replica to be restored to a state prior to the validating; and
apply the received update requests to the restored application data replica, wherein the tracked modifications include at least one modification of the application data replica caused by the applying.

13. A system for validating replicated data, the system comprising:
a storage device for storing an application data replica and tracking modifications to the application data replica, the tracked modifications enabling the application data replica to be restored to one or more prior states;
a replication server coupled to the storage device, the replication server configured to:
receive one or more requests to update the application data replica;
validate the application data replica, wherein the tracked modifications include at least one modification to the application data replica caused by the validating;
reverse the at least one modification to the application data replica, wherein the reversing causes the application data replica to be restored to a state prior to the validating; and
apply the received update requests to the restored application data replica, wherein the tracked modifications include at least one modification to the application data replica caused by the applying.

14. A system for validating replicated data, the system comprising at least one processing device operable to:
track modifications to an application data replica, the tracked modifications enabling the application data replica to be restored to one or more prior states;
receive one or more requests to update the application data replica;
validate the application data replica, wherein the tracked modifications include at least one modification to the application data replica caused by the validating;
reverse the at least one modification to the application data replica, wherein the reversing causes the application data replica to be restored to a state prior to the validating; and
apply the received update requests to the restored application data replica, wherein the tracked modifications include at least one modification to the application data replica caused by the applying.

* * * * *